Patented Mar. 18, 1930

1,751,117

UNITED STATES PATENT OFFICE

GUSTAV WIETZEL, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

MANUFACTURE OF COMBUSTIBLE GAS CONTAINING HYDROGEN AND CARBON MONOXIDE

No Drawing. Application filed September 17, 1925, Serial No. 57,041, and in Germany December 1, 1922.

Attempts have already been made to utilize pulverized fuels for uses other than heating furnaces, namely for the production of combustible gases but these attempts did not lead to a satisfactory result. In most cases the gases produced with the aid of pulverized fuel were of a poor calorific power and contained a high percentage of nitrogen and carbon dioxide and part of the coal was only carbonized and escaped gasification whereby considerable losses were caused. In addition, the gas contained varying amounts of methane and other hydrocarbons which made it unfit for chemical purposes, for example hydrogenation, synthesis of ammonia, and so on.

I have now found that gases of high calorific and industrial value can be obtained in a very simple manner by gasifying the pulverized fuel in a continuous process with the aid of a gas richer in free oxygen than atmospheric air. By the use of such gasifying media not only is the amount of combustible matter escaping gasification and carried away with the ashes very small, but any hydrocarbons such as methane and the like liberated during the gasifying process are practically completely destroyed and the percentage of carbon dioxide is kept low. In consequence thereof the gas after the removal of carbon monoxide, if desired, by decomposing it with steam in the presence of iron oxide or other suitable contact masses and absorbing the carbon dioxide formed and the carbon dioxide previously contained in the gas mixture, has a high percentage of hydrogen and is free from substantial amounts of hydrocarbons and can be used for hydrogenations or for the synthesis of ammonia or other chemical purposes. The practical performance of the process can be effected in any suitable manner and does not offer any difficulties to those conversant with the art.

For example, pulverized coal or lignite or lignite coke is blown into a high shaft gas generator with the aid of compressed air, and a high-grade oxygen as obtained for example from air is introduced into the said shaft generator, and the mixture of coal dust and oxygenated air is ignited in any suitable manner, whereupon the gasification is effected very rapidly and completely. Oxygen may also be used for blowing in the pulverized fuel as well as any other gas mixture richer in free oxygen than atmospheric air.

By such gasification gases are obtained, for instance, from lignite powder having approximately the following composition by volume:

| | Per cent |
|---|---|
| Carbon monoxide | 48.2 |
| Hydrogen | 27.2 |
| Methane | 0.6 |
| Carbon dioxide | 11.2 |
| Nitrogen | 12.8 |

I claim:

1. An exothermic process for manufacturing a gas rich in hydrogen and carbon monoxide, which comprises gasifying powdered solid carbonaceous fuel by reacting on the fuel with a gas containing substantially all free oxygen.

2. An exothermic process of manufacturing gases of high calorific and industrial value and rich in hydrogen and carbon monoxide, which comprises gasifying pulverulent solid fuel in a continuous process with the aid of a gas containing a higher percentage of free oxygen than atmospheric air.

3. An exothermic process of manufacturing gases of high calorific and industrial value and rich in hydrogen and carbon monoxide, which comprises gasifying pulverulent solid fuel in a continuous process with the aid of a gas containing a higher percentage of free oxygen than atmospheric air while completely avoiding any endothermic reaction.

4. An exothermic process of manufacturing gases of high calorific and industrial value and rich in hydrogen and carbon monoxide, which comprises gasifying pulverulent solid fuel in a continuous process with the aid of air containing added free oxygen.

In testimony whereof I have hereunto set my hand.

GUSTAV WIETZEL.